United States Patent
An et al.

(10) Patent No.: US 9,172,253 B2
(45) Date of Patent: Oct. 27, 2015

(54) APPARATUS AND METHOD FOR CHARGING A BATTERY PACK

(75) Inventors: Jin-Hong An, Suwon-si (KR); Jae-Soon Kim, Suwon-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 947 days.

(21) Appl. No.: 12/926,728

(22) Filed: Dec. 7, 2010

(65) Prior Publication Data

US 2011/0156647 A1 Jun. 30, 2011

(30) Foreign Application Priority Data

Dec. 28, 2009 (KR) .................. 10-2009-0131490

(51) Int. Cl.
*H02J 7/00* (2006.01)
*H02J 7/04* (2006.01)

(52) U.S. Cl.
CPC ............... *H02J 7/0008* (2013.01); *H02J 7/045* (2013.01)

(58) Field of Classification Search
USPC .......... 320/110, 112, 134, 145, 158, 163, 125
See application file for complete search history.

(56) References Cited

U.S. PATENT DOCUMENTS

| | | | |
|---|---|---|---|
| 4,433,294 A * | 2/1984 | Windebank ............... | 324/426 |
| 4,745,349 A * | 5/1988 | Palanisamy et al. ......... | 320/125 |
| 5,889,385 A * | 3/1999 | Podrazhansky et al. ...... | 320/130 |
| 7,183,748 B1 * | 2/2007 | Unno et al. .................... | 320/136 |
| 2009/0108804 A1 * | 4/2009 | Aradachi et al. ............. | 320/106 |

FOREIGN PATENT DOCUMENTS

| | | |
|---|---|---|
| KR | 2000-0005129 U | 3/2000 |
| KR | 10-2006-0125188 A | 12/2006 |
| KR | 10-2006-0128194 A | 12/2006 |
| KR | 10-2009-0026417 A | 3/2009 |

OTHER PUBLICATIONS

Linear Technology Corporation, "4.5A, 500kHz Step-Down Switching Regulator", LT1374, pp. 1-32.

* cited by examiner

*Primary Examiner* — Edward Tso
*Assistant Examiner* — Aaron Piggush
(74) *Attorney, Agent, or Firm* — Lee & Morse, P.C.

(57) ABSTRACT

A battery pack charger and a method of charging a battery pack may properly charge a battery pack regardless of the number of cells in the battery pack. The battery pack charger includes a voltage sensing unit configured to sense an output voltage of the battery pack being charged with a predetermined voltage for a predetermined period, a controller configured to determine a number of cells in the battery pack in accordance with the output voltage, and a power source charge and discharge unit configured to supply a charge voltage to the battery pack, the charge voltage being determined in accordance with the number of cells in the battery pack.

19 Claims, 2 Drawing Sheets

APPARATUS AND METHOD FOR CHARGING A BATTERY PACK

BACKGROUND

1. Field

Embodiments relate to an apparatus and method for charging a battery pack. More particularly, embodiments relate to an apparatus and method for charging a battery pack that may be used while being charged, regardless of the number of cells of the battery pack.

2. Description of the Related Art

In general, a secondary battery, as opposed to a primary battery, refers to a battery that may be charged as well as discharged. Secondary batteries are used for portable electronic devices, e.g., a mobile phone, a notebook computer, camcorder, and so forth. Secondary batteries include a nickel-cadmium secondary battery, a nickel-hydrogen secondary battery, and a lithium ion secondary battery. Lithium ion secondary batteries have a higher driving voltage and a higher energy density per unit weight than nickel-cadmium and nickel-hydrogen secondary batteries. Thus, lithium ion secondary batteries are currently more widely used than other types of secondary batteries.

Secondary batteries are used for a battery pack of a mobile telephone, a personal digital assistant (PDA), an MP3 player, a notebook, an electrical bicycle, and so forth. For example, current mobile telephones, PDAs, and MP3 players may have a single cell battery pack that uses one secondary battery or 2 to 4 cell battery packs in which two to four secondary batteries are serially coupled. In addition, electrical bicycles currently use 7 to 13 cell battery packs in which 7 to 13 secondary batteries are serially coupled. Different chargers are used in accordance with the number of cells in the battery pack and these different charges are not interchangeable for the different battery packs.

SUMMARY

Embodiments are therefore directed to a battery pack charger capable of charging a battery pack and a method of charging a battery pack, which substantially overcome one or more of the problems due to the limitations and disadvantages of the related art.

It is therefore a feature of an embodiment to provide a battery pack charger capable of charging a battery pack regardless of the number of cells of the battery pack and a method of charging a battery pack.

At least one of the above and other features and advantages may be realized by providing an apparatus for charging a battery pack, including a voltage sensing unit configured to sense an output voltage of the battery pack charged with a predetermined voltage for a predetermined period, a controller configured to determine a number of cells in the battery pack, and a power source charge and discharge unit configured to supply a charge voltage to the battery pack, the charge voltage being determined in accordance with the number of cells in the battery pack.

At least one of the above and other features and advantages may be realized by providing a method of charging a battery pack, including sensing an output voltage output from a battery pack after applying a predetermined voltage to a battery pack, determining a number of cells in the battery pack in accordance with the output voltage, and supplying a charge voltage to the battery pack, the charge voltage being determined in accordance with number of cells in the battery pack In the battery pack charger and the method of charging the battery pack according to embodiments, suitable voltages are supplied to various kinds of battery packs having different numbers of cells, so that various battery packs may be charged using one charger.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
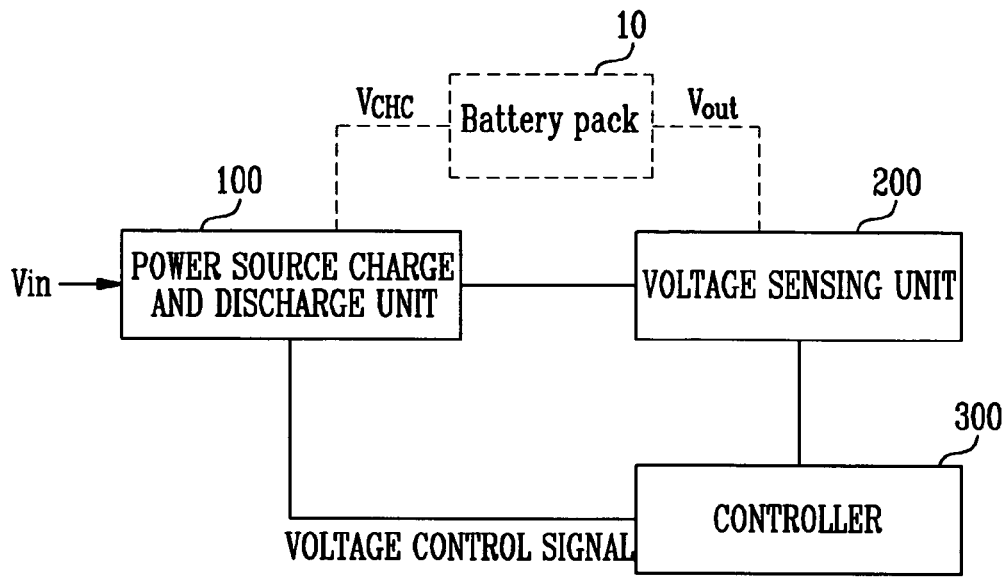
FIG. 1 illustrates a block diagram of the structure of a battery pack charger according to an embodiment.

Korean Patent Application No. 10-2009-0131490, filed on Dec. 28, 2009, in the Korean Intellectual Property Office, and entitled: "Apparatus for Charging Battery Pack and Method of Charging the Same," is incorporated by reference herein in its entirety.

In the following detailed description, only certain exemplary embodiments have been shown and described, simply by way of illustration. As those skilled in the art would realize, the described embodiments may be modified in various different ways, all without departing from the spirit or scope thereof. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

FIG. 1 illustrates a block diagram of a structure of a battery pack charger according to an embodiment connected to a battery pack 10, which is not part of the battery pack charger. Referring to FIG. 1, the battery pack charger may include a power source charge and discharge unit 100, a voltage sensing unit 200, and a controller 300.

The power source charge and discharge unit 100 may operate for a first voltage charge period and a second voltage charge period to charge or discharge the battery pack 10. In the first voltage charge period, a number of cells included in the battery pack 10 to be charged may be determined. In particular, during the first voltage charge period, a previously set voltage is supplied to the battery pack 10 for a predetermined time.

At the end of the first voltage charge period, an output voltage Vout from the battery pack 10 may be supplied to the voltage sensing unit 200. Then, the voltage sensing unit 200 may sense the voltage level of the output voltage Vout to determine a number of cells, i.e., the number of secondary batteries, in the battery pack 10. The controller 300 outputs a voltage control signal in response to the number of cells determined by the voltage sensing unit 200.

In the second voltage charge period, the power source charge and discharge unit 100 may supply a charge voltage Vchg determined in accordance with the voltage control signal from the controller 300, i.e., in accordance with the number of cells of the battery pack 10, to the battery pack 10. Thus, the battery pack charger according to embodiments may properly charge the battery pack 10.

The voltage sensing unit 200 senses the output voltage output after the battery pack has been charged with the predetermined voltage during the first voltage charge period. As the number of cells included in the battery pack 10 increases, the voltage level of the output voltage Vout increase. As the number of cells included in the battery pack 10 decreases, the voltage level of the output voltage Vout decreases. Therefore, the voltage level of the output voltage Vout after the first voltage charge period is directly proportional to the number of cells in the battery pack 10 to be charged. Thus, a relative number of cells in the battery pack 10 to be charged may be determined from the output voltage Vout, as will be discussed below with reference to FIG. 3.

The controller 300 may determine the number of cells of the battery pack to correspond to the voltage sensed by the voltage sensing unit 200. Then, the controller 300 may control the power source charge and discharge unit 100 to control the charge voltage Vcgh output from the power source charge and discharge unit 100 to the battery pack 10 in accordance with the number of cells in the battery pack. Therefore, charge may be stably performed regardless of the number of cells of the battery pack 10. In other words, the battery pack charger in accordance with embodiments may vary the charge voltage Vchg supplied to the battery pack 10 in accordance with a number of cells in the battery pack 10 to be charged. Thus, the battery pack charger in accordance with embodiments may be used to charge battery packs having varying numbers of cells, i.e., may serve as a universal charger.

Figure 2:
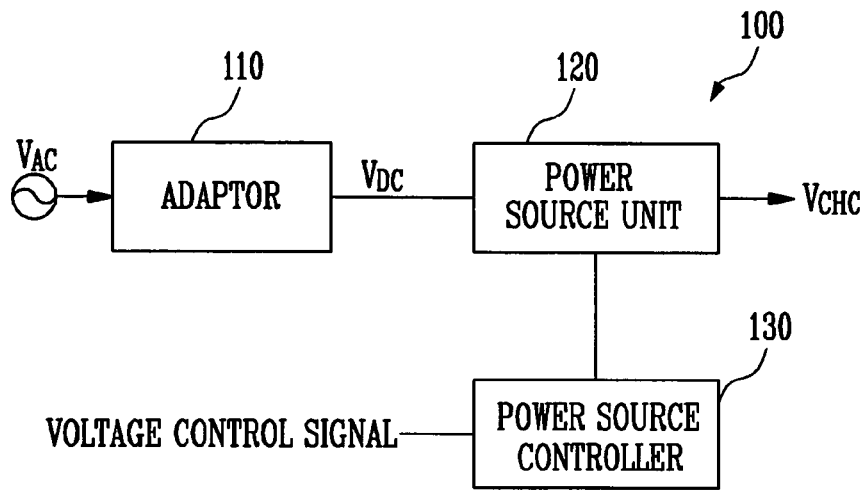
FIG. 2 illustrates a block diagram of the structure of a power source charge and discharge unit of the battery pack charger of FIG. 1.

FIG. 2 illustrates a detailed block diagram of a power source charge and discharge unit 100 of the battery pack charger of FIG. 1. Referring to FIG. 2, the power source charge and discharge unit 100 may include an adaptor 110, a power source unit 120 for outputting the charge voltage Vcgh using an input voltage from the adaptor 110, and a power source controller 130 for controlling the power source unit 120.

The adaptor 110 may convert an alternating current (AC) voltage VAC into previously set direct current (DC) voltage VDC to transmit the DC voltage VDC to the power source unit 120 as an input voltage. In general, when the power source supplied from the outside is an AC voltage, the AC voltage VAC is converted into the DC voltage VDC using the adaptor 110, so that the DC voltage VDC is supplied to the power source unit 120. The power source unit 120 may change the voltage level of the DC voltage VDC output from the adaptor 110. That is, the voltage level of the DC voltage VDC may be changed to correspond to the number of cells of the battery pack 10 determined by the controller 300.

The operation of the power source unit 120 will be described in detail. When a switching operation in the power source unit 120 is repeated with respect to the DC voltage VDC input from the adaptor 110, electrical energy is charged. Therefore, the voltage level of the DC voltage VDC input from the adaptor 110 is changed and output as the charge voltage Vcgh to charge the battery pack 10. The amount of the charged electrical energy varies in accordance with switching speed. The switching operation may block or transit the input voltage to charge electrical energy. When a suitable amount of charged energy is obtained, i.e., in accordance with the number of cells in the battery pack, the charged energy is output from the power source unit 120 as the charge voltage Vcgh to charge the battery pack 10.

The power source controller 130 may control the power source unit 120 to correspond to the voltage control signal output from the controller 300 to determine the level of the charge voltage Vcgh output from the power source unit 120. That is, the power source controller 130 may generate the voltage control signal whose pulse width is modulated and may control the pulse width of the voltage control signal to control the switching operation of the power source unit 120. Therefore, the voltage level of the charge voltage Vcgh applied from the power source unit 120 to the battery pack 10 may be changed to correspond to the number of cells in the battery pack 10 to be charged.

Figure 3:
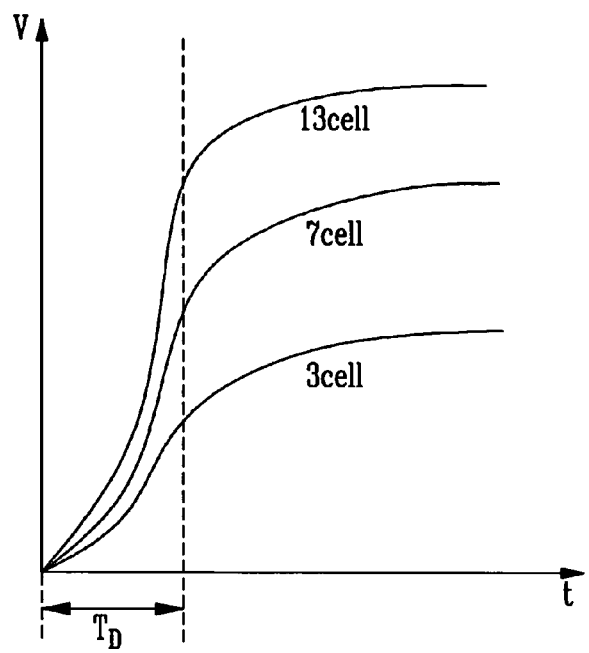
FIG. 3 illustrates a graph of voltages output from battery packs having different numbers of cells during a first charge period.

FIG. 3 illustrates a graph of voltages output from battery packs, which have different numbers of cells, during the first charge period. Referring to FIG. 3, the horizontal axis represents time and the vertical axis represents a voltage. The case in which the number of cells is 13, the case in which the number of cells is 10, and the case in which the number of cells is 7 are represented. Since a voltage rapidly changes in an initializing period $T_D$ in which a voltage starts to be applied in the first charge period, a stabilized voltage is determined after the initializing period $T_D$. A number of cells of the battery pack being charged may be determined in accordance with this stabilized voltage sensed after the initializing period $T_D$. As may be seen from this graph, as the number of cells of the battery pack increases, the stabilized voltage increases.

Since the voltage output from the battery pack increases as the number of cells increases, the number of cells is large when the voltage sensed after the initializing period $T_D$ is high and the number of cells is small when the voltage sensed after the initializing period $T_D$ is low. In other words, as noted above, the voltage sensed after the initializing period $T_D$ is directly proportional to the number of cells in the battery pack, so the voltage output from the battery pack charger may be appropriately controlled for a specific battery pack to be charged.

Figure 4:
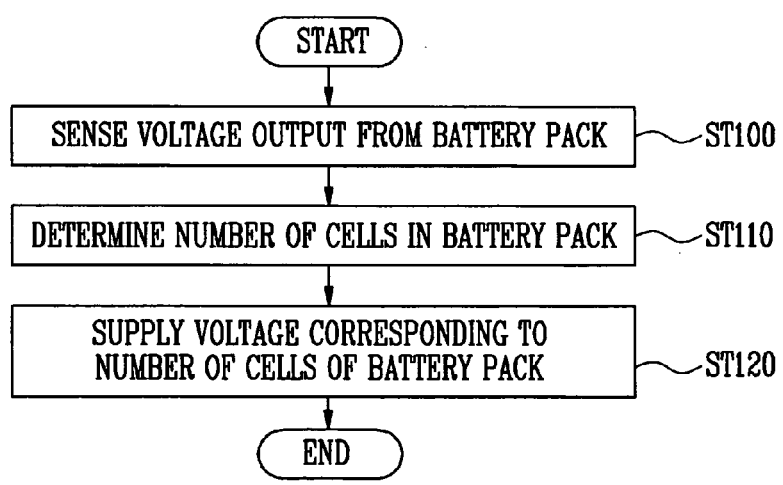
FIG. 4 illustrates a flowchart of a method of charging the battery pack using the battery pack charger according to an embodiment.

FIG. 4 illustrates a flowchart of a method of charging the battery pack of the battery pack charger according to an embodiment. Referring to FIG. 4, a charge voltage is applied to the battery pack for a predetermined time during the first charge period. After the initializing period $T_D$, the output voltage from the battery pack has stabilized and corresponds to the number of cells of the battery pack. The output voltage from the battery pack is then sensed (ST100).

The number of cells of the battery pack is determined in accordance with the sensed voltage (ST110). After determining the number of cells in the battery pack, the voltage control signal may be controlled, e.g., the pulse width of the voltage control signal may be set, in accordance with the number of cells in the battery pack to be charged.

Then, during the second charge period, the voltage corresponding to the number of cells of the battery pack is supplied to the battery to thereby charge the battery pack. The charge voltage changes in accordance with the voltage control signal. When the input voltage is switched using the voltage control signal, electrical energy is charged. The voltage level of the charge voltage is changed using the charged electrical energy.

Thus, in accordance with embodiments, during the first charge period, a predetermined voltage may be supplied to a battery pack to be charged. The number of cells in a battery pack may be determined in accordance with an output voltage from the battery pack. A charge voltage Vcgh to be used to charge the battery pack may then be controlled in accordance with the number of cells in the battery pack. Then, during the second charge period, the battery pack may be properly charged with the charge voltage Vcgh.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An apparatus for charging a battery pack, comprising:
   a voltage sensing unit to sense an output voltage of the battery pack charged with a predetermined voltage for a first period;
   a controller to determine a number of cells in the battery pack in accordance with the sensed output voltage; and
   a power source charge and discharge unit to supply the predetermined voltage to the battery pack for the first period and to supply a charge voltage to the battery pack for a second period, after the controller has determined the number of cells in the battery pack, the charge voltage being determined in accordance with the number of cells in the battery pack, wherein
   the predetermined voltage is set with a constant voltage regardless of the number of cells in the battery pack for the first period, and the charge voltage is changed according to the number of cells in the battery for the second period.

2. The apparatus as claimed in claim 1, wherein the power source charge and discharge unit comprises a power source unit to supply the charge voltage to the battery pack so that a voltage level of the charge voltage supplied to the battery pack is determined in accordance with the voltage level of the sensed output voltage.

3. The apparatus as claimed in claim 2, wherein the power source charge and discharge unit comprises a power source controller to output a voltage control signal to control a switching operation of the power source unit.

4. The apparatus as claimed in claim 3, wherein the power source controller is to control the switching operation of the power source unit by a pulse width of the voltage control signal.

5. The apparatus as claimed in claim 4, wherein the power source unit changes the voltage level of the charge voltage by the switching operation.

6. The apparatus as claimed in claim 2, wherein the power source unit is configured to receive an input voltage from an adaptor changing an alternating current (AC) voltage into a direct current (DC) voltage.

7. The apparatus as claimed in claim 1, wherein the output voltage from the battery pack is directly proportional to the number of cells in the battery.

8. The apparatus as claimed in claim 1, wherein the voltage sensing unit is to sense the output voltage of the battery pack charged with the predetermined voltage after an initializing period.

9. The apparatus as claimed in claim 1, wherein the first period occurs before the controller determined the number of cells in the battery pack.

10. The apparatus as claimed in claim 1, wherein:
    a voltage level of the predetermined voltage is constant for the first period, and
    a voltage level of the charge voltage is constant for the second period.

11. A method of charging a battery pack, comprising:
    applying a predetermined voltage to the battery pack for a first period using a power source charge and discharge unit;
    sensing an output voltage output from the battery pack after applying the predetermined voltage to the battery pack for the first period;
    determining a number of cells in the battery pack in accordance with the sensed output voltage; and
    supplying a charge voltage to the battery pack using the power source charge and discharge unit, the charge voltage being determined in accordance with number of cells in the battery pack for a second period, wherein
    the predetermined voltage is set with a constant voltage regardless of the number of cells in the battery pack for the first period, and the charge voltage is changed according to the number of cells in the battery for the second period.

12. The method as claimed in claim 11, wherein determining the number of cells of the battery pack is in accordance with a voltage level of the output voltage.

13. The method as claimed in claim 11, wherein supplying the charge voltage to the battery pack includes repeating a switching operation on an input voltage such that the input voltage is transmitted or blocked to charge electrical energy and outputting a charge voltage higher than the input voltage.

14. The method as claimed in claim 13, further comprising controlling repeating in accordance with a voltage control signal.

15. The method as claimed in claim 14, wherein controlling is in accordance with a pulse width of the voltage control signal.

16. The method as claimed in claim 13, wherein the input voltage is a direct current (DC) voltage converted from an alternating current (AC) voltage from an external source.

17. The method as claimed in claim 11, wherein sensing the output voltage includes sensing the output voltage of the battery pack charged with the predetermined voltage after an initializing period.

18. The method as claimed in claim 11, wherein applying the predetermined voltage before determining the number of cells.

19. The method as claimed in claim 11, wherein:
    a voltage level of the predetermined voltage is constant for the first period, and
    a voltage level of the charge voltage is constant for the second period.

* * * * *